United States Patent
Mountziaris et al.

(10) Patent No.: US 8,859,000 B2
(45) Date of Patent: *Oct. 14, 2014

(54) SYNTHESIS OF NANOPARTICLES BY AN EMULSION-GAS CONTACTING PROCESS

(75) Inventors: Triantafillos J. Mountziaris, Williamsville, NY (US); Paschalis Alexandridis, East Amherst, NY (US)

(73) Assignee: The Research Foundation of State University of New York, Amherst, NY (US)

(*) Notice: Subject to any disclaimer, the term of this patent is extended or adjusted under 35 U.S.C. 154(b) by 2243 days.

This patent is subject to a terminal disclaimer.

(21) Appl. No.: 10/839,538

(22) Filed: May 5, 2004

(65) Prior Publication Data
US 2005/0006800 A1   Jan. 13, 2005

Related U.S. Application Data

(60) Provisional application No. 60/467,975, filed on May 5, 2003.

(51) Int. Cl.
| | |
|---|---|
| *A61K 9/14* | (2006.01) |
| *B82Y 5/00* | (2011.01) |
| *C01B 17/00* | (2006.01) |
| *C01G 1/02* | (2006.01) |
| *C01G 9/08* | (2006.01) |
| *C01B 19/00* | (2006.01) |
| *C01G 21/21* | (2006.01) |
| *B82Y 30/00* | (2011.01) |
| *C01G 11/02* | (2006.01) |
| *B01J 13/02* | (2006.01) |
| *C01G 1/12* | (2006.01) |

(52) U.S. Cl.
CPC .............. *B82Y 30/00* (2013.01); *C01P 2004/64* (2013.01); *C01G 1/02* (2013.01); *C01G 9/08* (2013.01); *C01B 19/007* (2013.01); *C01P 2004/62* (2013.01); *C01G 21/21* (2013.01); *C01P 2002/72* (2013.01); *C01G 11/02* (2013.01); *B01J 13/02* (2013.01); *C01G 1/12* (2013.01); *C01P 2004/04* (2013.01); *Y10S 977/70* (2013.01)
USPC .............. 424/489; 977/700; 423/508; 438/99

(58) Field of Classification Search
CPC ..... A61K 8/25; A61K 8/19; A61K 2800/412; A61K 49/0423; B82Y 30/00; B82Y 40/00; B82Y 5/00; H01L 21/02601; A23V 2200/25
See application file for complete search history.

(56) References Cited

U.S. PATENT DOCUMENTS

| | | |
|---|---|---|
| 5,019,400 A | 5/1991 | Gombotz et al. |
| 5,133,955 A | 7/1992 | Raghavan et al. |

(Continued)

OTHER PUBLICATIONS

Pickett et al. Gas-phase synthesis of nanoparticles of group 12 chalcogenides. J. Material Chem. 1997, 7(9), pp. 1855-1865.*

(Continued)

*Primary Examiner* — Lakshmi Channavajjala
(74) *Attorney, Agent, or Firm* — LeClairRyan, a Professional Corporation

(57) ABSTRACT

The present invention is directed to a process for synthesizing nanoparticles. This process involves providing a stable emulsion containing a plurality of droplets suspended in a continuous phase. The droplets, which are encapsulated by an interfacially-active material, contain a first reactant dissolved in a dispersed phase. The process also involves contacting a gas phase containing a second reactant diluted in a carrier gas with the stable emulsion under conditions effective to permit the first reactant and second reactant to react and form nanoparticles. The present invention further relates to nanoparticle-loaded emulsions and their uses in formulations for various purposes.

57 Claims, 5 Drawing Sheets

(56) References Cited

U.S. PATENT DOCUMENTS

| | | | |
|---|---|---|---|
| 5,147,841 A | 9/1992 | Wilcoxon | |
| 5,260,957 A | 11/1993 | Hakimi et al. | |
| 5,262,357 A | 11/1993 | Alivisatos et al. | |
| 5,505,928 A | 4/1996 | Alivisatos et al. | |
| 5,537,000 A | 7/1996 | Alivisatos et al. | |
| 5,751,018 A | 5/1998 | Alivisatos et al. | |
| 5,990,479 A | 11/1999 | Weiss et al. | |
| 6,207,229 B1 | 3/2001 | Bawendi et al. | |
| 6,207,392 B1 | 3/2001 | Weiss et al. | |
| 6,225,198 B1 | 5/2001 | Alivisatos et al. | |
| 6,235,224 B1 | 5/2001 | Mathiowitz et al. | |
| 6,251,303 B1 | 6/2001 | Bawendi et al. | |
| 6,274,323 B1 | 8/2001 | Bruchez et al. | |
| 6,306,610 B1 | 10/2001 | Bawendi et al. | |
| 6,306,736 B1 | 10/2001 | Alivisatos et al. | |
| 6,319,426 B1 | 11/2001 | Bawendi et al. | |
| 6,322,901 B1 | 11/2001 | Bawendi et al. | |
| 6,326,144 B1 | 12/2001 | Bawendi et al. | |
| 6,423,551 B1 | 7/2002 | Weiss et al. | |
| 6,426,513 B1 | 7/2002 | Bawendi et al. | |
| 6,440,213 B1 | 8/2002 | Alivisatos et al. | |
| 6,444,143 B2 | 9/2002 | Bawendi et al. | |
| 6,500,622 B2 | 12/2002 | Bruchez, Jr. et al. | |
| 6,501,091 B1 | 12/2002 | Bawendi et al. | |
| 6,503,382 B1 | 1/2003 | Bartlett et al. | |
| 6,548,264 B1 * | 4/2003 | Tan et al. | 435/7.21 |
| 6,576,291 B2 | 6/2003 | Bawendi et al. | |
| 6,602,671 B1 | 8/2003 | Bawendi et al. | |
| 6,607,829 B1 | 8/2003 | Bawendi et al. | |
| 6,617,583 B1 | 9/2003 | Bawendi et al. | |
| 6,630,307 B2 | 10/2003 | Bruchez et al. | |
| 6,649,138 B2 | 11/2003 | Adams et al. | |
| 6,653,080 B2 | 11/2003 | Bruchez et al. | |
| 6,682,596 B2 | 1/2004 | Zehnder et al. | |
| 6,692,660 B2 | 2/2004 | Kumar | |
| 6,696,299 B1 | 2/2004 | Empedocles et al. | |
| 6,699,723 B1 | 3/2004 | Weiss et al. | |
| 6,727,065 B2 | 4/2004 | Weiss et al. | |
| 6,805,904 B2 * | 10/2004 | Anders et al. | 427/203 |
| 7,417,712 B2 * | 8/2008 | Ando et al. | 355/67 |
| 2003/0003300 A1 | 1/2003 | Korgel et al. | |
| 2004/0007169 A1 | 1/2004 | Ohtsu et al. | |
| 2004/0072937 A1 | 4/2004 | Tomalia et al. | |
| 2004/0118698 A1 | 6/2004 | Lu et al. | |
| 2006/0240590 A1 | 10/2006 | Mountziaris et al. | |
| 2006/0275196 A1 | 12/2006 | Alexandridis et al. | |

OTHER PUBLICATIONS

Alexandridis et al., "A Record Nine Different Phases (Four Cubic, Two Hexagonal, and One Lamellar Lyotropic Liquid Crystalline and Two Micellar Solutions) in a Ternary Isothermal System of an Amphiphilic Block Copolymer and Selective Solvents (Water and Oil)," *Langmuir* 14(10):2627-2638 (1998).

Alexandridis et al., "Self-Assembly of Amphiphilic Block Copolymers: The $(EO)_{13}(PO)_{30}(EO)_{13}$-Water-*p*-Xylene System," *Macromolecules* 28(23):7700-7710 (1995).

Alexandridis et al., "Thermodynamics of Droplet Clustering in Percolating AOT Water-in-Oil Microemulsions," *J. Phys. Chem.* 99(20):8222-8232 (1995).

Alexandridis, P., "Small-Angle Scattering Characterization of Block Copolymer Micelles and Lyotropic Liquid Crystals," *ACS Symp. Ser.* 861:60-80 (2003).

Alexandridis, P., "Structural Polymorphism of Poly(Ethylene Oxide)-Poly(Propylene Oxide) Block Copolymers in Nonaqueous Polar Solvents," *Macromolecules* 31(20):6935-6942 (1998).

Alivisatos, A.P., "Semiconductor Clusters, Nanocrystals, and Quantum Dots," *Science* 271:933-937 (1996).

Berling & Olofsson, "Solvation of Small Hydrophobic Molecules in Formamide: A Calorimetric Study," *J. Solution Chem.* 23:911-923 (1994).

Chestnoy et al., "Higher Excited Electronic States in Clusters of ZnSe, CdSe, and ZnS: Spin-Orbit, Vibronic, and Relaxation Phenomena," *J. Chem. Physics* 85(4):2237-2242 (1986).

Fendler, J.H., "Self-Assembled Nanostructured Materials," *Chem. Mater.* 8(8):1616-1624 (1996).

Goldstein et al., "Melting in Semiconductor Nanocrystals," *Science* 256:1425-1427 (1992).

Holmes et al., "Highly Luminescent Silicon Nanocrystals with Discrete Optical Transitions," *J. Am. Chem. Soc.* 123(16):3743-3748 (2001).

Jiang et al., "Zinc Selenide Nanoribbons and Nanowires," *J. Phys. Chem. B* 108(9):2784-2787 (2004).

Karanikolos et al., "Synthesis and Size Control of Luminescent II-VI Semiconductor Nanocrystals by a Novel Microemulsion-Gas Contacting Technique," *Mater. Res. Soc. Symp. Proc.* 789:N15.55.1-N15.55.6 (2004).

Karanikolos et al., "Synthesis and Size Control of Luminescent ZnSe Nanocrystals by a Microemulsion-Gas Contacting Technique," *Langmuir* 20(3):550-553 (2004).

Karanikolos et al., "Templated Synthesis of ZnSe Nanostructures Using Lyotropic Liquid Crystals," *Nanotechnology* 16:2372-2380 (2005).

Kouklin et al., "Giant Photoresistivity and Optically Controlled Switching in Self-Assembled Nanowires," *Appl. Phys. Lett.* 79(26):4423-4425 (2001).

Kumbhojkar et al., "Quantum Confinement Effects in Chemically Grown, Stable ZnSe Nanoclusters," *NanoStruct. Mater.* 10(2):117-129 (1998).

Lehtinen et al., "Effect of Coalescence Energy Release on the Temporal Shape Evolution of Nanoparticles," *Phys. Rev. B* 63:205402-1-205402-7 (2001).

Leppert et al., "Structural and Optical Characteristics of ZnSe Nanocrystals Synthesized in the Presence of a Polymer Capping Agent," *Mater. Sci. Eng. B* 52(1):89-92 (1998).

Li et al., "Control Synthesis of Semiconductor ZnSe Quasi-Nanospheres by Reverse Micelles Soft Template," *Mater. Lett.* 59(13):1623-1626 (2005).

Li et al., "Preparation and Optical Properties of Sol-Gel Derived ZnSe Crystallites Doped in Glass Films" *J. Appl. Phys.* 75(8):4276-4278 (1994).

Lv et al., "Growth and Characterization of Single-Crystal ZnSe Nanorods via Surfactant Soft-Template Method," *Solid State Commun.* 130(3-4):241-245 (2004).

Michalet et al., "Properties of Fluorescent Semiconductor Nanocrystals and Their Application to Biological Labeling," *Single Mol.* 2(4):261-276 (2001).

Murray et al., "Synthesis and Characterization of Monodisperse Nanocrystals and Close-Packed Nanocrystal Assemblies," *Annu. Rev. Mater. Sci.* 30:545-610 (2000).

Norris et al., "High-Quality Manganese-Doped ZnSe Nanocrystals," *Nano Lett.* 1(1):3-7 (2001).

Odian, G., "Principles of Polymerization," Third Edition, John Wiley & Sons, Inc., New York (1991) (Cover Page and Table of Contents only).

Peck et al., "Metalorganic Vapor Phase Epitaxy of $Zn_{1-x}Fe_xSe$ Films," *J. Cryst. Growth* 170(1-4):523-527 (1997).

Rossetti et al., "Quantum Size Effects in the Redox Potentials, Resonance Ramam Spectra, and Electronic Spectra of CdS Crystallites in Aqueous Solution," *J. Chem. Phys.* 79(2):1086-1088 (1983).

Sakai & Alexandridis, "Size- and Shape-Controlled Synthesis of Colloidal Gold Through Autoreduction of the Auric Cation by Poly (Ethylene Oxide)-Poly(Propylene Oxide) Block Copolymers in Aqueous Solutions at Ambient Conditions," *Nanotechnology* 16:S344-S353 (2005).

Sarigiannis et al., "Characterization of Vapor-Phase-Grown ZnSe Nanoparticles," *Appl. Phys. Lett.* 80(21):4024-4026 (2002).

Soler-Illia et al., "Block Copolymer-Templated Mesoporous Oxides," *Curr. Opin. Colloid Interface Sci.* 8(1):109-126 (2003).

Svensson et al., "Self-Assembly of a Poly(Ethylene Oxide)/Poly(Propylene Oxide) Block Copolymer (Pluronic P104, $(EO)_{27}(PO)_{61}(EO)_{27}$) in the Presence of Water and Xylene," *J. Phys. Chem. B* 102(39):7541-7548 (1998).

Teng & Yang, "Effects of Surfactants and Synthetic Conditions on the Sizes and Self-Assembly of Monodisperse Iron Oxide Nanoparticles," *J. Mater. Chem.* 14(4):774-779 (2004).

(56) References Cited

OTHER PUBLICATIONS

Velev et al., "A Class of Microstructured Particles Through Colloidal Crystallization," *Science* 287:2240-2243 (2000).
Wang et al., "Synthesis and Characterization of MSe (M=Zn, Cd) Nanorods by a New Solvothermal Method," *Inorg. Chem. Commun.* 2(3):83-85 (1999).
Wong & Ying, "Amphiphilic Templating of Mesostructured Zirconium Oxide," *Chem. Mater.* 10(8):2067-2077 (1998).
Xia et al., "One-Dimensional Nanostructures: Synthesis, Characterization, and Applications," *Adv. Mater.* 15(5):353-389 (2003).
Yang et al., "Growth of CdS Nanorods in Nonionic Amphiphilic Triblock Copolymer Systems," *Chem. Mater.* 14(3):1277-1284 (2002).
Zhang et al., "Growth and Luminescence of Zinc-Blende-Structured ZnSe Nanowires by Metal-Organic Vapor Deposition," *Appl. Phys. Lett.* 83(26):5533-5535 (2003).
Zhao et al., "Preparation of CdS Nanoparticles in Salt-Induced Block Copolymer Micelles," *Langmuir* 17(26):8428-8433 (2001).
Zhao et al., "Triblock Copolymer Syntheses of Mesoporous Silica with Periodic 50 to 300 Angstrom Pores," *Science* 279:548-552 (1998).
Zhu & Bando, "Preparation and Photoluminescence of Single-Crystal Zinc Selenide Nanowires," *Chem. Phys. Lett.* 377(3-4):367-370 (2003).
Alexandridis et al., "Micellization of Polyoxyalkylene Block Copolymers in Formamide," *Macromolecules* 33:3382-3391 (2000).
Alexandridis et al., eds., *Amphiphilic Block Copolymers: Self-Assembly and Applications*, Amsterdam, The Netherlands:Elsevier Science B.V., pp. v-vi (Table of Contents) (2000).
Gerion et al., "Synthesis and Properties of Biocompatible Water-Soluble Silica-Coated CdSe/ZnS Semiconductor Quantum Dots," *J. Phys. Chem. B*. 105:8861-8871 (2001).
Hines et al., "Bright UV-Blue Luminescent Colloidal ZnSe Nanocrystals," *J. Phys. Chem. B*. 102:3655-3657 (1998).
Imhof et al., "Stability of Nonaqueous Emulsions," *J. Colloid Interface Sci.* 192:368-374 (1997).
Lin et al., "Adsorption of a Rake-Type Siloxane Surfactant Onto Carbon Black Nanoparticles Dispersed in Aqueous Media," *Langmuir* 18:6147-6158 (2002).
Lin et al., "Adsorption of a Polymeric Siloxane Surfactant On Carbon Black Particles Dispersed in Mixtures of Water With Polar Organic Solvents," *J. Colloid Interface Sci.* 255:1-9 (2002).
Lin et al., "Adsorption of Amphiphilic Copolymers on Hydrophobic Particles in Aqueous Media," *J. Disp. Sci. Tech.* 23:539-553 (2002).
Lin et al., "Temperature-Dependent Adsorption of Pluronic F127 Block Copolymers Onto Carbon Black Particles Dispersed in Aqueous Media," *J. Phys. Chem. B*. 106:10834-10844 (2002).
Norris et al., "High-Quality Manganese-Doped ZnSe Nanocrystals," *Nano Letters* 1:3-7 (2001).
Quinlan et al., "Reverse Micelle Synthesis and Characterization of ZnSe Nanoparticles," *Langmuir* 16:4049-4051 (2000).
Revaprasadu et al., "Single-Source Molecular Precursors for the Deposition of Zinc Selenide Quantum Dots," *J. Mater. Chem.* 8:1885-1888 (1998).
Zhu et al., "General Sonochemical Method for the Preparation of Nanophasic Selenides: Synthesis of ZnSe Nanoparticles," *Chem. Mater.* 12:73-78 (2000).
Hines et al., "Synthesis and Characterization of Strongly Luminescing ZnS-Capped CdSe Nanocrystals," J. Phys. Chem. 100:468-471 (1996).
Hines et al., "Bright UV-Blue Luminescent Colloidal ZnSe Nanocrystals," J. Phys. Chem. B 102(19):3655-3657 (1998).
Karanikolos et al., "Synthesis and Functionalization of ZnSe Nanocrystals in a Multi-Phase Reactor," slide presentation presented at the annual meeting of American Institute of Chemical Engineers in Nov. 2002.
International Search Report and Written Opinion for PCT/US2004/014073 (mailed Dec. 13, 2005).
Karanikolos et al., "Synthesis and Size Control of Luminescent II-VI Semiconductor Nanocrystals by a Novel Microemulsion-Gas Contacting Technique," presentation presented at the annual meeting of American Institute of Chemical Engineers in Nov. 2003.

\* cited by examiner

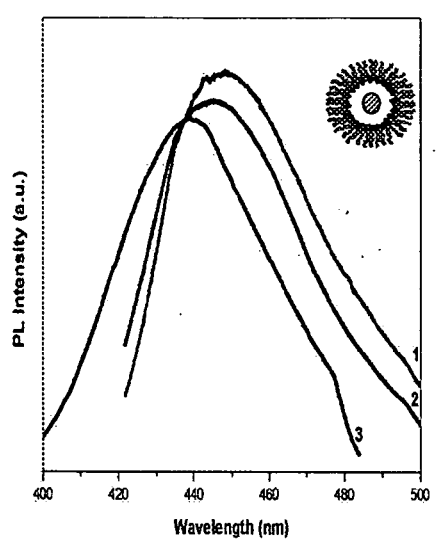 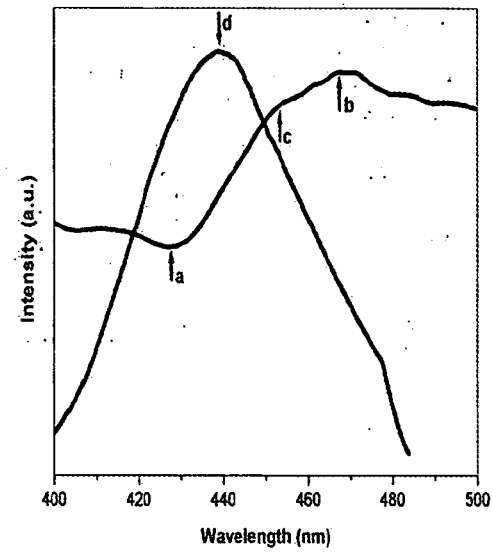
FIG. 3A        FIG. 3B
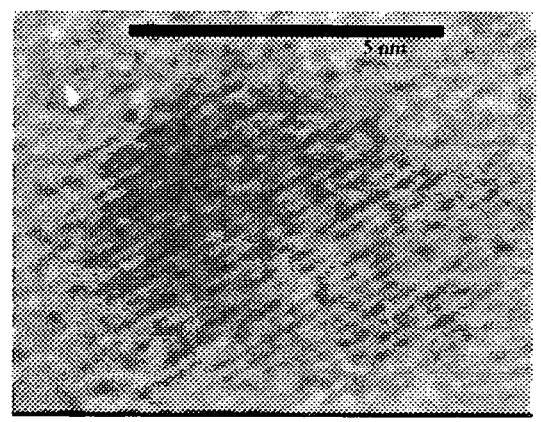
FIG. 3C

SYNTHESIS OF NANOPARTICLES BY AN EMULSION-GAS CONTACTING PROCESS

This application claims the benefit of U.S. Provisional Patent Application Ser. No. 60/467,975, filed May 5, 2003, which is hereby incorporated by reference in its entirety.

FIELD OF THE INVENTION

The present invention relates to a process for synthesizing nanoparticles using an emulsion-gas contacting process.

BACKGROUND OF THE INVENTION

A great variety of techniques are being used for the synthesis of nanoparticles of inorganic compounds. Most of these techniques suffer from lack of precision in controlling particle size and properties. The current state of the art in the synthesis of semiconductor nanocrystals involves the use of high temperature batch reactors. This process uses a hot coordinating solvent, such as hexadecylamine and trioctyl-phosphine, in which the reactants are injected with a syringe. Particles grow as a function of time and samples are taken at specific times to obtain populations of a certain average size. It is difficult to control particle size distributions in such reactors and almost impossible to isolate particles with a specific, pre-determined particle size. Using this approach, post-processing and functionalization requires many additional steps that can compromise the quality of the particles. Further, the technique cannot be scaled-up easily for industrial production.

Semiconductor nanocrystals (quantum dots) are exotic materials whose optical and electronic properties can be manipulated by changing their size or composition (Alivisatos, *Science* 271:933 (1996); Murray et al., *Annu. Rev. Mater. Sci.* 30:545 (2000)). When the size of the nanocrystals becomes smaller than the corresponding de Broglie wavelength or Bohr radius (mean separation of an optically excited electron-hole pair), quantum confinement phenomena take place and change the nanocrystal properties dramatically. II-VI quantum dots (e.g., CdSe, CdS, ZnS, or ZnSe), with sizes of a few nanometers ("nm"), exhibit size-dependent luminescence, broad excitation by all wavelengths smaller than the emission wavelength, high brightness, narrow and symmetric emission, and excellent photostability (Alivisatos, *Science* 271:933 (1996); Murray et al., *Annu. Rev. Mater. Sci.* 30:545 (2000)). In addition to playing an important role in fundamental studies on solid-state physics (Empedocles et al., *Adv. Mater.* 11:1243 (1999)), quantum dots can be used in photovoltaic devices (Huynh et al., *Adv. Mater.* 11:923 (1999)), photodetectors (Towe et al., *IEEE J. Sel. Top. Quant. Electr.* 6:408 (2000)), and as fluorescent biological labels (Michalet et al., *Single Mol.* 2:261 (2001)).

The most common synthesis route for II-VI nanocrystals involves reactions between organometallic compounds in a trioctylphosphine (TOP)/trioctylphosphine oxide (TOPO) and/or hexadecylamine (HDA) coordination solvent carried out in small batch reactors operating at ~300° C. CdSe and CdS quantum dots have been the most common materials grown by this technique (Murray et al., *J. Am. Chem. Soc.* 115:8706 (1993)). Luminescent ZnSe nanocrystals exhibiting high quantum yield (Hines et al., *J. Phys. Chem. B.* 102:3655 (1998); Revaprasadu et al., *J. Mater. Chem.* 8:1885 (1998)) and (Zn,Mn)Se diluted magnetic nanocrystals (Norris et al., *Nano Lett.* 1:3 (2001)) have also been grown. To grow monodisperse nanocrystal populations the requirements include instantaneous injection and mixing of the reactants, uniform nucleation over the entire mass of the solvent, and perfect mixing during the entire process. Such conditions are difficult to achieve and selective precipitation techniques are used after synthesis to narrow down the size distribution of the nanocrystals (Murray et al., *Annu. Rev. Mater. Sci.* 30:545 (2000)). Other reported techniques for growing ZnSe nanocrystals include arrested precipitation (Chestnoy et al., *J. Chem. Phys.* 85:2237 (1986)), sol-gel processing (Li et al., *J. Appl. Phys.* 75:4276 (1994)), sono-chemical processing (Zhu et al., *Chem. Mater.* 12:73 (2000)), growth in reverse micelles (Quinlan et al., *Langmuir* 16:4049 (2000)), and vapor-phase synthesis (Sarigiannis et al., *Appl. Phys. Lett.* 80:4024 (2002)).

The use of a template is typically required for growing monodisperse particle populations. Control of particle microstructure has been achieved by colloidal crystallization in aqueous droplets suspended on the surface of a fluorinated oil (Velev et al., *Science* 287:2240 (2000)). Monodisperse populations of Si quantum dots, with surfaces passivated by an organic monolayer, were grown by thermally degrading diphenysilane in supercritical octanol (Holmes et al., *J. Am. Chem. Soc.* 123:3743 (2001)). ZnSe nanocrystals were grown in bis-2-ethylhexylsulphosuccinate sodium salt (AOT) reverse micelles by reacting zinc perchlorate hexahydrate and sodium selenide (Quinlan et al., *Langmuir* 16:4049 (2000)). Under ideal conditions, reverse micelles could function as identical nanoreactors, thus providing a template for precise control of particle size. In practice, the fast dynamics of droplet coalescence in water-in-oil microemulsions lead to the formation of droplet clusters and polydisperse particle populations (Zhao et al., *Langmuir* 17:8428 (2001)).

The present invention is directed to overcoming these and other deficiencies in the art.

SUMMARY OF THE INVENTION

The present invention relates to a process for synthesizing nanoparticles. This process involves providing a stable emulsion containing a plurality of droplets suspended in a continuous phase. The droplets, which are encapsulated by an interfacially-active material, contain a first reactant dissolved in a dispersed phase. The process also involves contacting a gas phase containing a second reactant diluted in a carrier gas with the stable emulsion under conditions effective to permit the first reactant and second reactant to react and form nanoparticles.

The present invention also relates to a nanoparticle-loaded emulsion. In one embodiment, the nanoparticle-loaded emulsion contains a continuous phase, an interfacially-active material, and a dispersed phase. The dispersed phase can include a plurality of droplets suspended in the continuous phase, where the droplets contain nanoparticles and are encapsulated by the interfacially-active material. The present invention further relates to cosmetic formulations and surface-coating formulations containing the nanoparticle-loaded emulsions of the present invention.

The processes for synthesizing the nanoparticles and nanoparticle-loaded emulsions described herein have the following advantages over the current state of the art: (1) precise control of nanoparticle size; (2) easy incorporation of functional units; and (3) scalability. Precise control of nanoparticle size is achieved, because by using the process of self-assembly, it is possible to form numerous identical droplets (e.g., nanoreactors) in which the nanoparticles are grown. Due to the ease of incorporating functional materials onto the nanoparticles, the process of the present invention allows for a variety of functional units to be introduced throughout the process to passivate and functionalize the surface of the nanoparticles. This can enable numerous applications (discussed herein infra). Further, regarding scalability, the process of the present invention can be scaled-up very easily for industrial production, without sacrificing the precision in controlling the particle size.

The nanoparticles synthesized according to the process of the present invention can exhibit size-dependent properties due to 3-D quantum confinement of electrons and holes. For example, the nanoparticles can exhibit the following attributes: (1) size-tuned band gap energy; (2) size-tuned luminescence and absorption; (3) narrow and symmetric emission; (4) broad excitation by a wide range of wavelengths; (5) high quantum efficiency; (6) high brightness; (7) high sensitivity; (8) photochemical stability; (9) long fluorescence lifetime; and (10) negligible photobleaching. Thus, the nanoparticles and nanoparticle-loaded emulsions of the present invention can be used in promising applications, including, for example, in bioengineering and pharmaceutics as luminescent tags for biomolecules, in the development of new materials for photonic applications, and in the development of optically active formulations for use in cosmetics and surface-coatings (e.g., camouflaged military vehicles, building surfaces). For example, the nanoparticles can be used in such applications as luminescent biological labeling, ultra sensitive biological detection, multiplexed DNA arrays, medical diagnostics and therapeutics (e.g., imaging, photodynamic therapy), high density optical data storage and processing, high resolution flat panel displays, tunable lasers, tunable light emitting diodes, photodetectors and photovoltaics, catalysis in photochemical reactions, optically-active nano-composites, and spintronics (i.e., in forming materials for the active regions of devices that manipulate the spin of a single electron).

BRIEF DESCRIPTION OF THE DRAWINGS

FIGS. 3A-3C demonstrate the photoluminescence and transmission spectra of ZnSe quantum dots produced according to the process of the present invention, without any post-processing. FIG. 3A is a graph showing the photoluminescence spectra of ZnSe quantum dots obtained by microemulsion-gas contacting. The emission wavelength is blue-shifted compared to bulk ZnSe (460 nm) as the particle size decreases. The three curves (indicated as curves 1, 2, and 3) correspond to 0.3, 0.03, and 0.003 M diethylzinc concentration in heptane. The inset is a schematic of a ZnSe quantum dot encapsulated in a heptane nanodroplet. FIG. 3B is a graph showing the superposition of photoluminescence and transmission spectra for curve 3 in FIG. 3A. FIG. 3C is a micrograph showing the high-resolution TEM image of ZnSe nanocrystal obtained by processing a 0.3 M diethylzinc solution in a 40 nm heptane nanodroplets (curve 1 of FIG. 3A).

DETAILED DESCRIPTION OF THE INVENTION

Figure 1:
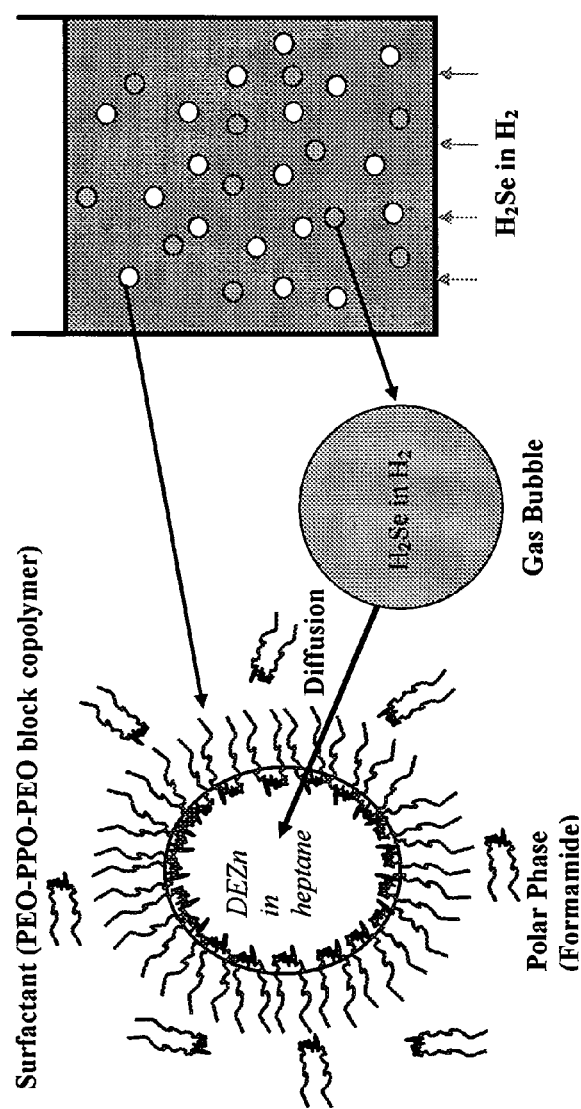
FIG. 1 is a schematic representation of one embodiment of the microemulsion-gas contacting technique used for ZnSe nanocrystal synthesis. Hydrogen selenide gas is bubbled through the microemulsion, diffuses into the heptane nanodroplets, and reacts with diethylzinc. The ZnSe nuclei (clusters) formed in each droplet grow by surface reactions and particle-particle coalescence, leading to the formation of a single nanocrystal per nanodroplet.

The present invention relates to a process for synthesizing nanoparticles. This process involves providing a stable emulsion containing a plurality of droplets suspended in a continuous phase. The droplets, which are encapsulated by an interfacially-active material, contain a first reactant dissolved in a dispersed phase. The process also involves contacting a gas phase containing a second reactant diluted in a carrier gas with the stable emulsion under conditions effective to permit the first reactant and second reactant to react and form nanoparticles.

In one aspect, the nanoparticles produced by the processes of the present invention can have a diameter of between about 1 and about 100 nanometers, particularly between about 1 and about 50 nanometers, and more particularly between about 1 and 10 nanometers. The nanoparticles can be of substantially the same size. In another aspect, the size of the nanoparticles produced by the process of the present invention is dependent on the initial concentration of the first reactant prior to contacting the gas phase to the stable emulsion.

The nanoparticles produced by the processes of the present invention can be of various forms, including, for example, nanoparticles of crystalline form, polycrystalline form, or amorphous form. In one embodiment, the nanoparticles can be nanocrystals. In particular, the nanoparticles can be single crystals that exhibit long-range order of the atoms contained in each nanoparticle that extends continuously over the entire mass of the nanoparticle. The nanoparticles can also be polycrystalline particles, including particles consisting of sintered single-crystalline grains (Sarigiannis et al., *Appl. Phys. Lett.* 80:4024 (2002), which is hereby incorporated by reference in its entirety). Further, the nanoparticles can be amorphous particles exhibiting no long-range order of the atoms that form them. The shape of the individual particles can be arbitrary, for example, spherical, or rod-like. However, the individual particles can also have other shapes such as dumbbells, discs, or aggregates of smaller particles that form dendrite-like structures.

The nanoparticles produced by the process of the present invention can have various attributes. For example, the nanoparticles can exhibit size-dependent luminescence and/or fluorescence. The nanoparticles can also be of various compositions. For example, the nanocrystals can be luminescent Group II-Group VI nanocrystals of the form MX, where M is Zn, Cd, or Hg, and where X is Se, S, Te, or O. More particularly, the nanocrystals can include, for example, ZnSe, ZnS, ZnTe, CdSe, CdS, CdTe, PbSe, and PbS nanocrystals. In a specific embodiment, the nanocrystals are ZnSe or CdSe nanocrystals having a diameter of between about 1.0 and about 10 nanometers.

The various components suitable for use in the process of the present invention are described below in more detail for exemplary purposes.

With respect to the droplets (referenced herein), a suitable size of the droplets can include, for example, droplets having an average diameter of between about 10 and about 200 nanometers, particularly between about 20 and about 80, and more particularly between about 30 and about 60 nanometers.

Suitable interfacially-active materials can include, without limitation, surfactants, block copolymers, water-dispersible polymers, amphiphilic molecules, solid particles, and/or solvent-swollen particles (see Holmberg et al. *Surfactants and Polymers in Aqueous Solution* 2nd ed., Wiley & Sons (2003), which is hereby incorporated by reference in its entirety). Examples of block copolymers can include copolymers made by joining poly(ethylene oxide) or poly(acrylic acid) blocks with polystyrene or polybutylene or polydimethylsiloxane. An exemplary block copolymer can include a poly(ethylene oxide)-poly(propylene oxide)-poly(ethylene oxide) block copolymer. Exemplary surfactants for use in the present invention can be natural (e.g., lipids), synthetic (e.g., alkyl benzyl sulfonates), ionic (e.g., sodium dodecyl sulfate), cationic (e.g., alkyl-trimethylammonium chloride), nonionic (e.g., alkyl ethoxylates), or zwitterionic (e.g. betaine). The surfactants can also be single species (e.g., one type of molecule present) or mixtures of species (e.g., mixture of anionic and cationic surfactants, mixture of an ionic surfactant and an aliphatic alcohol). The surfactants can also be monodisperse or polydisperse. Examples of suitable water-dispersible polymers can include dextran, guar gum, and gelatine. Examples of suitable solid particles for use in the present invention can include silica, aluminum oxide, and titanium oxide. Suitable solvent-swollen particles can include latexes.

Various combinations of dispersed phases and continuous phases can be used to form the stable emulsion described herein. In particular, the dispersed phase can include a first emulsion precursor and the continuous phase can include a second emulsion precursor. The first emulsion precursor and the second emulsion precursor are to be sufficiently immiscible with one another so that they can effectively yield a stable emulsion when mixed with a suitable interfacially-active material. In one embodiment, the first emulsion precursor can be a polar solution and the second emulsion precursor can be a nonpolar solution. In another embodiment, the first emulsion precursor can be a nonpolar solution and the second emulsion precursor can be a polar solution. In yet another embodiment, the first emulsion precursor and the second emulsion precursor can both be polar solutions. In still another embodiment, the first emulsion precursor and the second emulsion precursor can both be nonpolar solutions (e.g., silicon oil in a nonpolar hydrocarbon solvent). Suitable nonpolar solutions can include, for example, an organic solvent such as n-hexane, n-heptane, or n-octane. Suitable polar solutions can include, for example, formamide or water.

Suitable first reactants and second reactants for use in the process of the present invention can include any elements or compounds that are capable of reacting with one another to form a nanoparticle (as defined and discussed herein). By way of example, suitable first reactants and suitable second reactants described herein infra.

A suitable first reactant can include a metal-containing compound. Exemplary metals can include, without limitation, Zn, Cd, Hg, and Pb. Another example of a suitable first reactant can include an organometallic compound. Exemplary organometallic compounds can include, without limitation, dimethyl-Zn, dimethyl-Cd, dimethyl-Hg, diethyl-Zn, diethyl-Cd, diethyl-Hg, tetramethyl-Pb, and tetraethyl-Pb.

Suitable second reactants can be in the form of a gas or vapor. A particular suitable second reactant can include, for example, a Group VI element-containing compound. Exemplary Group VI elements can include, without limitation, Se, S, Te, and O. In one embodiment, the second reactant can be a Group VI element-containing compound in the form of a hydride (e.g., a hydride of Se, S, or Te). More particularly, the second reactant can be $H_2Se$ gas. In another embodiment, the second reactant can be an oxygen-containing compound. Exemplary oxygen-containing compounds can include molecular oxygen ($O_2$) gas, ozone ($O_3$) gas, or water ($H_2O$) vapor. In yet another embodiment, the second reactant can be a Te-containing compound. Exemplary Te-containing compounds can include vapors of dimethyl-Te, diethyl-Te, or diisopropyl-Te.

Suitable carrier gases for use in the present invention can include any gas that does not react with either of the first reactant, the second reactant, the stable emulsion, or a product of the processes of the present invention. Exemplary carrier gases can include, without limitation, hydrogen, nitrogen, helium, and argon.

Various specific embodiments of the process of the present invention are included below for exemplary purposes.

In one embodiment of the process of the present invention, the first reactant is diethyl-Zn, the dispersed phase is n-heptane, and the second reactant is $H_2Se$. In another embodiment of the process of the present invention, the first reactant is diethyl-Zn, the dispersed phase is n-heptane, the second reactant is hydrogen selenide, and the carrier gas is hydrogen. The initial concentration of the diethyl-Zn in the n-heptane can be from between about 0.001 M and about 0.3 M. In this particular embodiment, the diethyl-Zn and the $H_2Se$ react to form ZnSe nanocrystals having a diameter of not greater than about 10 nanometers, and more particularly not greater than about 9 nanometers.

In another embodiment of the process of the present invention, the continuous phase is formamide, the interfacially-active material is a poly(ethylene oxide)-poly(propylene oxide)-poly(ethylene oxide) block copolymer, and the dispersed phase is n-heptane.

In one aspect of the process of the present invention, the droplets can further include a third reactant such as, for example, a transition metal-containing compound. Suitable transition metals can include, without limitation, Mn, Fe, and Co. In one embodiment, the transition metal-containing compound can be in the form of a metal-carbonyl compound or a metal-alkyl compound. The transition metal can be provided in an amount effective to yield diluted magnetic semiconductor nanoparticles. In a particular embodiment, the diluted magnetic semiconductor nanoparticles can be compounds having the formula of $Zn_{1-x}Mn_xSe$, where x is a value between about 0 and about 0.2.

Various suitable means for contacting the gas phase to the stable emulsion can be used. As an example, one suitable means for contacting the gas phase to the stable emulsion can include, without limitation, bubbling the gas phase through the stable emulsion under conditions effective to allow the second reactant to diffuse into the droplets and to react with the first reactant to form the nanoparticles. In one embodiment, the contacting step can be performed at a temperature at which the stable emulsion remains stable at atmospheric pressure or at a pressure higher than atmospheric pressure.

In another embodiment, the process can further include incorporating a functional material onto the surface of the nanoparticles. This step is effective in enhancing the functionality of the nanoparticles for use in various nanotech applications. As described in more detail herein, such nanotech applications can include, for example, applications involving nanobiotechnology, nanoelectronics, and/or nanomaterials. In one embodiment, the functional material can be dissolved in the dispersed phase prior to contacting the gas phase to the stable emulsion. Alternatively, the functional material can be added to the outer surface of the nanoparticle after synthesis of the nanoparticle. Suitable functional materials can include, without limitation, thiol-based compounds or amine-based compounds.

Another aspect of the process of the present invention involves isolating the nanoparticles after synthesis (e.g, after reaction of the first reactant and the second reactant). Various methods well known in the art for isolating particles from emulsions can be used.

The present invention also relates to a nanoparticle-loaded emulsion produced by the process of the present invention. In one embodiment, the nanoparticle-loaded emulsion is prepared by providing a stable emulsion containing a plurality of droplets suspended in a continuous phase. Suitable droplets are as described herein, and particularly droplets containing a first reactant dissolved in a dispersed phase. The droplets are also encapsulated by an interfacially-active material (as described herein). The process further involves contacting a gas phase (containing a second reactant diluted in a carrier gas) with the stable emulsion under conditions effective to permit the first reactant and second reactant to react and form nanoparticles within the droplets. This process is effective in yielding a nanoparticle-loaded emulsion. Suitable nanoparticles contained in the nanoparticle-loaded emulsion can be those as described herein. In one embodiment, the nanoparticles contain a metal element and a Group VI element. Further, the nanoparticles can be optically active. The nanoparticles can also be of substantially the same size.

The present invention also relates to a nanoparticle-loaded emulsion that includes a continuous phase, an interfacially-active material, and a dispersed phase. The dispersed phase can contain a plurality of droplets suspended in the continuous phase, where the droplets are encapsulated by the interfacially-active material, and where the droplets contain nanoparticles. Suitable nanoparticles contained in the nanoparticle-loaded emulsion can be those as described herein. In one embodiment, the nanoparticles contain a metal element and a Group VI element. Further, the nanoparticles can be optically active. The nanoparticles can also be of substantially the same size.

The present invention further relates to a cosmetic formulation suitable for topical application to a mammal (e.g., humans). The cosmetic formulation can include a cosmetically acceptable carrier and a cosmetically acceptable amount of the nanoparticle-loaded emulsion of the present invention. Suitable cosmetically acceptable carriers can include, without limitation, a hydrophilic cream base, a hydrophilic lotion base, a hydrophilic surfactant base, a hydrophobic cream base, a hydrophobic lotion base, and a hydrophobic surfactant base.

The present invention also relates to a surface-coating formulation suitable for topical application to an inanimate object (e.g., vehicles, buildings). The formulation can include a surface-coating carrier and a nanoparticle-loaded emulsion of the present invention.

In another aspect, the process of the present invention can be used to synthesize nanophase materials with precise control on the nanoparticle size. As provided by the present invention, the dispersed phase of the stable emulsion is capable of forming numerous identical nano-reactors, such that in each one of those nano-reactors a nanoparticle is synthesized. As an example, during preparation of the stable emulsion, a precise ratio of the interfacial-active material (e.g., a surfactant) and the dispersed phase is used to yield a specific droplet size. The droplet size can be measured using light scattering analysis. The first reactant can be dissolved in the dispersed phase at a concentration calculated to yield a nanoparticle of a certain size after complete conversion. A gas phase containing the second reactant can be bubbled through the emulsion. The second reactant diffuses through the continuous phase and the interfacially-active material into the dispersed phase where it reacts with the first reactant and produces a nanoparticle of the desired size. Further, functionalization of the surface of the nanoparticles with molecules that stabilize it and allow post-processing for applications can be introduced in a variety of ways through the dispersed phase, continuous phase, interfacially-active material, and/or gas phase.

Using the process of the present invention, various ways of synthesizing monodisperse (uniform-sized) nanocrystals (e.g., ZnSe, CdSe) by exploiting gas-liquid contacting in precisely engineered micro-emulsions can be developed. The dispersed phase of these emulsions forms numerous identical nano-reactors, with a single nanocrystal being synthesized in each one of them. One advantage of the process of the present invention over the existing colloidal chemistry routes for nanocrystal synthesis (Hines et al., "Bright UV-Blue Luminescent Colloidal ZnSe Nanocrystals," *J. Phys. Chem. B.* 102:3655-3657 (1998); Norris et al., "High-Quality Manganese-Doped ZnSe Nanocrystals," *Nanoletters* 1:3-7 (2001), which are hereby incorporated by reference in their entirety) is the precise control of composition and particle size. The high temperature colloidal synthesis employs a batch reactor that suffers from poor control of the particle size distribution. The size screening and functionalization of nanocrystals obtained by the high temperature colloidal route is very tedious and involves several post-processing steps.

The process of the present invention can be used to eliminate problems related to droplet coalescence (e.g., it can eliminate the rapid droplet-droplet coalescence problem hampering reverse micelles), and further provides good control on particle size, and can produce luminescent nanocrystals with size-dependent properties. In one aspect, coalescence of the clusters of nanoparticles formed inside the droplets yields a single nanocrystal per nanodroplet, whose crystalline structure can be attributed to the energy released during coalescence.

In addition to producing monodisperse assemblies of nanocrystals, the process of the present invention can be used to simplify the functionalization of nanocrystals. Hybrid nanocrystal-polymer composites can be synthesized by adding polymerizable surface ligands in the dispersed phase. For example, 4-thiomethyl styrene can serve both as a capping agent for the nanocrystals and as a co-monomer in the polymerization of styrene, after the particles have been dispersed in it. This can allow for the synthesis of novel photonic materials having nanocrystals as the building blocks (active centers) in a polymer matrix consisting of macromolecular tethers between the nanocrystals.

Using the process of the present invention, a novel class of functional materials, inorganic-organic composite nanocrystals including a semiconductor core and a polymer corona, can be developed by a number of synthesis routes. These synthesis routes can include, for example, the following: (a) the nanocrystal surface can be capped with thiols possessing a reactive end-group, which can be used to attach or grow a polymer chain; (b) the nanocrystal surface can be coated with silicon oxide, and well-established silane chemistry can be used to chemically attach polymers (Gerion et al., "Synthesis and Properties of Biocompatible Water-Soluble Silica-Coated CdSe/ZnS Semiconductor Quantum Dots," *J. Phys. Chem. B.* 105:8861-8871 (2001), which is hereby incorporated by reference in its entirety); and (c) the nanocrystals can be placed in the dispersed phase of a suspension polymerization process (Odian, G., "Principles of Polymerization," Wiley, 3$^{rd}$ ed. (1991), which is hereby incorporated by reference in its entirety) and the monomer allowed to polymerize around them, producing latex beads containing several nanocrystals. Alternatively, an initiator can be attached to the nanocrystals, followed by emulsion polymerization, resulting in a single polymer chain coating a single nanocrystal. In addition to the above "chemical" approaches, "physical" binding of polymers to nanocrystals can occur upon suspension in a solvent containing dissolved high-molecular weight polymer. Following polymer adsorption (Lin et al., "Adsorption of a Rake-Type Siloxane Surfactant Onto Carbon Black Nanoparticles Dispersed in Aqueous Media," *Langmuir* 18:6147-6158 (2002); Lin et al., "Adsorption Properties of a Polymeric Siloxane Surfactant Onto Carbon Black Particles Dispersed in Mixtures of Water With Polar Solvents," *J. Colloid Interface Sci.* 255:1-9 (2000); Lin et al., "Adsorptoin of Amphiphilic Copolymers on Hydrophobic Particles in Aqueous Media," *J. Disp. Sci. Tech.* 23:539-553 (2002); Lin et al., "Temperature-Dependent Adsorption of Pluronic F127 Block Copolymers Onto Carbon Black Particles Dispersed in Aqueous Media," *J. Phys. Chem. B.* 106:1083-10844 (2002), which are hereby incorporated by reference in their entirety) on the nanocrystals and the removal of the solvent by spray drying, porous polymer particles, each containing many ZnSe nanocrystals, can be obtained. Alternatively, the precipitation of the polymer on the particle surface, following a worsening of the solvent quality, can result in a suspension of polymer-coated ZnSe nanocrystals.

Structural, morphological, and chemical characterization of the nanocrystals can be performed by using transmission electron microscopy (TEM), atomic force microscopy (AFM), energy dispersive analysis of X-rays, and optical spectroscopy (Raman, transmission and photoluminescence). By measuring the effective band gap of these materials using transmission spectroscopy, the increase in gap with decreasing nanoparticle size and the variation of bandgap with composition in ternary materials can be precisely recorded. The characterization of DMS nanocrystals and the corresponding polymer-nanocrystal hybrids will focus on measurements of magneto-optical effects by applying a variable external magnetic field. An 8-Tesla superconducting magnet with a Janis optical cryostat can be used. Characterization of the chemical attachment on the surface can be done by spectroscopic means or by solvent treatment aimed to remove non-covalently attached material. ESCA/XPS can be used to quantify the surface atom composition prior to and following the polymer attachment/adsorption. SEM and TEM can be used to measure the corona thickness (because the polymer has a very different electron density than ZnSe) and the state of aggregation (number of ZnSe nanoparticles per composite particle). The amount of polymer present can be determined from a material balance (involving the weights of the reactants and product) and/or from a thermogravimetric analysis where the organic material is burned off while the inorganic material forms oxides.

The nanoparticles and nanoparticle-loaded emulsions of the present invention can be used in various applications in clinical diagnostics and proteomics. Such suitable applications are included below by way of example. In particular, the development of "sandwich-type" immunoassays using fluorescent nanocrystals (quantum dots) can be achieved. This immunoassay can be used to detect antigens (e.g., drugs, proteins, or biological infectious agents), using the specific binding between an antibody and the antigen under scrutiny.

In multiplexing form, a sandwich-type immunoassay can be used to simultaneously detect several antigens using two populations of antibodies that can selectively bind each antigen. As an example, suitable components of the assay can include: (1) a surface (e.g., the inner surface of a cavity) functionalized with streptavidin; (2) a population of a biotinylated antibody for each antigen to be detected (e.g., an antibody linked to biotin, which is a protein that has high affinity for streptavidin); and (3) a second population of a labeled antibody for each antigen to be detected (e.g., an antibody that has been linked to semiconductor nanocrystals of specific size that can fluoresce at a specific wavelength). A different population of nanocrystals can be used to label the antibodies of different antigens. Further, the nanocrystal populations can be chosen to emit at distinct wavelengths that can be detected simultaneously and uniquely when all populations are present in the same solution.

As an example, the detection of the antigens can be achieved using the following steps: (1) exposure of the surface of the cavity to an aqueous solution containing the biotynilated antibody populations and incubation for a few minutes to allow binding of the antibodies to the surface; (2) a wash step with water to remove the unbound biotynilated antibodies; (3) exposure of the surface to the sample that possibly contains the antigens to be detected and incubation for a few minutes to allow specific binding of the antigens to the biotinylated antibodies that are bound to the surface; (4) a wash step with water to remove all unbound matter; (5) exposure to an aqueous solution containing the labeled antibody populations and incubation for a few minutes to allow specific binding of the labeled antibodies with the antigens; (6) a wash step with water to remove all unbound material from the cavity; (7) the cavity is exposed to UV light with wavelength shorter than the smallest wavelength at which emission is expected from the nanocrystals; (8) detection of emitted light from the surface at a specific wavelength, corresponding to the labeled antibodies of a certain antigen, provides a positive detection of the antibody in question; (9) multiplexing is achieved by the ability to simultaneously detect several antigens; and (10) quantitative analysis can be achieved by calibrating the intensity of the emitted light with known concentrations of the corresponding antigen. A variation of the above procedure for speedup of the detection time utilizes a mixture of all antibody populations and the sample and a single incubation step followed by a wash step. This procedure can be useful when multiplexing is not essential but a quick response time is needed, such as for detection of biological warfare agents in the field.

The nanoparticles and nanoparticle-loaded emulsions of the present invention can also be used in coatings, cosmetics, and surface treatments. For example, the nanocrystal-loaded emulsions can be used in formulations of surface coatings (e.g., paints) that respond to UV light from natural (e.g., from the sun) or manmade sources (e.g., UV lamps). The formulations may include additional components, such as inorganic particles (for opacity) and polymeric particles (for film formation). These coatings will change color when the UV source is present and return to their original color (or transparency) when the UV source is eliminated. Potential applications can include, for example: (1) applications related to camouflage of equipment that include coatings and patterns attaining specific colors during the day by utilizing the luminescence of the nanocrystals and a different color at night when the excitation from the sun's UV radiation is not present; (2) architectural, automotive, and general-purpose coatings that can change color when exposed to sunlight due to emission from the nanocrystals and attain a different color at night; (3) cosmetics that respond to sunlight with a temporary change of color enabled by the luminescence of the nanocrystals (the original color (or transparency) is recovered when the UV source is eliminated); and (4) apparel that contain such nanocrystal formulations providing the ability to change color when exposed to a UV source and to recover the original color upon elimination of the UV radiation (for civilian or military applications).

EXAMPLES

Example 1

Synthesis and Size-Control of Luminescent ZnSe Nanocrystals by a Microemulsion-Gas Contacting Technique A schematic representation of one embodiment of emulsion-gas contacting technique of the present invention is shown in FIG. 1. A microemulsion was formed by self assembly using a solution of diethylzinc (($C_2H_5$)$_2$Zn) in n-heptane (n-$C_7H_{16}$) as the dispersed oil phase, formamide ($CH_3NO$) as the polar continuous phase, and an amphiphilic block copolymer, poly(ethylene oxide)-poly(propylene oxide)-poly(ethylene oxide) or PEO-PPO-PEO, as the surfactant. PEO is the formamide-soluble block and PPO the heptane-soluble block (Alexandridis et al., *Macromolecules* 33:3382 (2000), which is hereby incorporated by reference in its entirety). PEO-PPO block copolymers represent an exciting class of amphiphilic molecules with high versatility, in terms of self-assembly and corresponding practical applications (Alexandridis et al., Eds. *Amphiphilic Block Copolymers: Self-Assembly and Applications*, Elsevier Science B. V.: Amsterdam (2000), which is hereby incorporated by reference in its entirety). Imhof et al. (Imhof et al., *J. Colloid Interface Sci*. 192:368 (1997), which is hereby incorporated by reference in its entirety) tested a variety of different combinations of amphiphiles with non-aqueous polar solvents, and reported that PEO-PPO-PEO block copolymers form very stable emulsions in formamide. Formamide was used instead of water, because it is sufficiently polar to be immiscible in heptane and it does not react with diethylzinc. Hydrogen selenide ($H_2Se$) gas diluted in hydrogen was bubbled through the microemulsion at room temperature and atmospheric pressure, diffused into the nanodroplets, and reacted with diethylzinc to yield ZnSe and ethane ($C_2H_6$). By assuming (and subsequently verifying) that a single ZnSe particle is formed in each nanodroplet, the initial concentration of diethylzinc was used to specify the particle size.

Diethylzinc (($C_2H_5$)$_2$Zn, 1M solution in n-heptane), formamide ($CH_3NO$, 99.5+%), and n-heptane (n-$C_7H_{16}$, 99%) were purchased from Aldrich. Electronic-grade hydrogen selenide gas ($H_2Se$, 5% mixture with $H_2$) was purchased from Solkatronic Chemicals. Pluronic P105, poly(ethylene oxide)-poly(propylene oxide)-poly(ethylene oxide) or PEO-PPO-PEO block copolymer ($EO_{37}PO_{58}EO_{37}$, with MW of 6,500 and 50% PEO content), was provided by BASF Corporation. All chemicals were used "as received." Care was taken to avoid exposure of the hygroscopic formamide and PEO-PPO-PEO to atmospheric moisture. Standard airless techniques were used to avoid exposure of diethylzinc to oxygen and moisture.

The diethylzinc-containing microemulsions were formed as follows: (a) 3.33 gr PEO-PPO-PEO was added to 20 ml formamide and the mixture was stirred for 1.5 hrs.; (b) 0.5 ml of diethylzinc-heptane solution was added to PEO-PPO-PEO/formamide solution under nitrogen; and (c) the final mixture was sonicated for 1.5 hrs. The resulting liquid was transparent and homogeneous, an indication that a microemulsion was formed (Danielsson et al., *Colloids Surf*. 3:391 (1981), which is hereby incorporated by reference in its entirety). It was subsequently transferred to the reactor (located in a vented enclosure) under nitrogen. A flow of 20 sccm 5% hydrogen selenide in hydrogen was established and the gas was allowed to bubble through the microemulsion for 15 min. This time was found to be sufficient for converting all the diethylzinc to ZnSe. The reactor was subsequently purged with nitrogen for 1 hr to remove all traces of hydrogen selenide. The gases exiting the reactor were passed through a cracking furnace and a bed of adsorbents before released into a fume hood. A hydride detector was used to ensure personnel safety.

Photoluminescence (PL) emission spectra were obtained by loading samples from the reactor into quartz cuvettes and analyzing them using a 0.5 m single-stage spectrometer (CVI Laser Corp.), equipped with a thermoelectrically-cooled multi-channel CCD detector (Camera AD-205 working in the wavelength range of 200-1100 nm). A 325 nm line of a 20 mW He—Cd UV laser (Melles Giot) was used to excite the nanocrystals. Transmission spectra from samples loaded in quartz cuvettes were obtained by using a 150 W Xenon lamp (UV) and a 0.35 m scanning monochromator (McPherson) with PMT phase sensitive detection. The samples used for transmission electron microscopy were prepared by placing a drop of the processed microemulsion on a 400-mesh carbon-coated copper grid (Ernest F. Fullam, Inc.) and leaving it under vacuum for 48 hours to evaporate the solvents. The instrument used was a JEOL JEM 2010 high-resolution TEM, operated at 200 kV, with a point-to-point resolution of 0.193 nm. Dynamic light scatterering was performed to estimate the microemulsion droplet size, prior to each synthesis experiment, using a model 95 argon ion laser (Lexel Corp.) with a BI-200SM goniometer detector (Brookhaven Instruments Corp.) operating at an angle of 90°. X-ray diffraction was performed using a Siemens D500 XR diffractometer.

Figure 2:
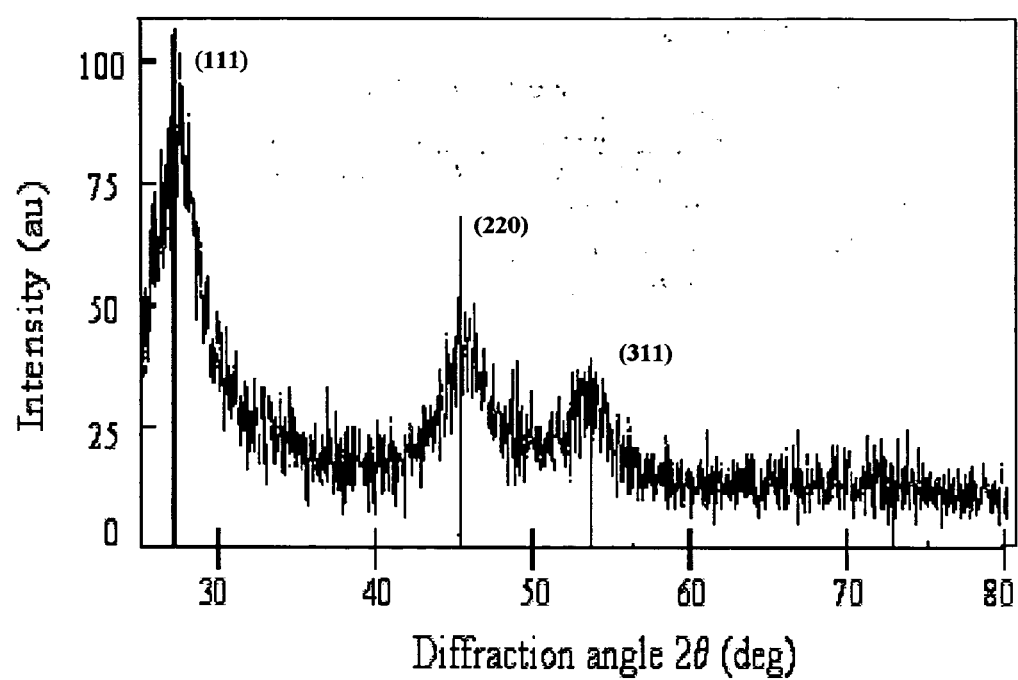
FIG. 2 is a graph showing the X-ray diffraction pattern from ZnSe particle aggregates obtained by reacting diethylzinc (diluted in heptane) with hydrogen selenide gas (diluted in hydrogen) at room temperature. The vertical lines at 27.2°, 45.2°, and 53.6° correspond to the expected diffraction angles of the (111), (220), and (311) planes of cubic ZnSe.

To investigate the feasibility of the proposed chemistry for low-temperature synthesis of crystalline ZnSe, the 5% hydrogen selenide/hydrogen gas mixture was first bubbled through a 0.1 M solution of diethylzinc in heptane at room temperature and atmospheric pressure. This "proof-of-principle" experiment did not involve a microemulsion. The result was a suspension of ZnSe particle aggregates in heptane. Samples taken from the suspension were placed on clean quartz wafers and the heptane was evaporated under vacuum. The resulting deposits of ZnSe particles on quartz were analyzed by x-ray diffraction. The diffraction peaks obtained (FIG. 2) match the standard peaks corresponding to cubic (zinc blende) ZnSe, confirming that the reaction does yield crystalline ZnSe at room temperature. No indication of a hexagonal (wurtzite) structure was found. Since the results were encouraging, subsequent experiments were conducted using microemulsions in order to precisely control the particle size.

The effect of surfactant to dispersed phase molar ratio on the droplet size of the heptane/PEO-PPO-PEO/formamide microemulsions was investigated first. Measurements were taken of the size and uniformity of the heptane nanodroplets using dynamic light scattering. A mixture of 12.6 wt % PEO-PPO-PEO and 1.3 wt % n-heptane in formamide was found to form stable microemulsions with an average droplet diameter of 40 nm and was used for the nanocrystal growth experiments. An estimation was made of the diethylzinc concentration in the heptane to obtain a single ZnSe crystal of a particular size in each droplet, upon full conversion. The underlying assumption is that, if several particles nucleate in a single droplet, particle diffusion within that droplet would be sufficient to eventually form a single nanocrystal through particle-particle coalescence.

The overall reaction forming ZnSe is:

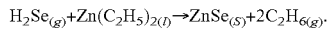

$$H_2Se_{(g)} + Zn(C_2H_5)_{2(l)} \rightarrow ZnSe_{(s)} + 2C_2H_{6(g)}.$$

It is spontaneous and exothermic with heat of reaction −380 kJ/mole (Lide, "CRC Handbook of Chemistry and Physics, 3$^{rd}$ Electronic ed. CRC Press (2000); "NIST Chemistry WebBook: NIST Standard Reference Database Number 69"—July 2001 Release, which are hereby incorporated by reference in their entirety). This reaction has been used in the past for growing single crystalline thin films of ZnSe by metalorganic vapor phase epitaxy (MOVPE) (Jones, A. C., *J. Crystal Growth* 129:728 (1993); Peck et al., *J. Crystal Growth* 170: 523 (1997), which are hereby incorporated by reference in their entirety). In the present experiments, nucleation of particles probably occurs simultaneously at different locations inside each droplet. The nuclei grow by addition of precursors to their surface (i.e., by surface growth reactions) and by particle-particle coalescence to eventually yield a single ZnSe particle. The heat released by the reaction between the precursors and by particle-particle coalescence is sufficient to increase the temperature locally (Lehtinen et al., *Phys. Rev. B* 63:205402-1 (2001), which is hereby incorporated by reference in its entirety) and to enable the formation of crystalline particles through annealing. The macroscopic temperature of the mixture remains constant (room temperature). The apparent melting point of nanoparticles is suppressed as their size decreases (Sarigiannis et al., *Appl. Phys. Lett.* 80:4024 (2002), which is hereby incorporated by reference in its entirety) and, as a result, annealing requires a smaller increase in temperature than that for bulk crystals.

Three concentrations of diethylzinc in heptane were used to obtain nanocrystals for the photoluminescence experiments: 0.3, 0.03, and 0.003 M. The corresponding estimated particle size is 8 nm, 3.7 nm, and 1.7 nm, respectively (for 40 nm droplets). The ZnSe bulk exciton Bohr diameter, below which confinement phenomena are expected, has been reported to be 9 nm (Leppert et al., *Mat. Sci. Eng. B* 52:89 (1998), which is hereby incorporated by reference in its entirety). The PL emission spectra of the three representative samples are shown in FIG. 3A. The three peaks at 449 nm for curve (1), 444 nm for curve (2), and 439 nm for curve (3) correspond to 0.3, 0.03, and 0.003 M diethylzinc concentration in heptane. There is a systematic blue shift of the emission peak from sample 1 to sample 3, which clearly indicates that the average size of the ZnSe nanocrystals decreases. Each peak is single, symmetric, and narrow, indicating good control on particle size and crystal structure, without any post-processing step. The width of the peaks is narrower or comparable to that obtained from ZnSe nanocrystal populations synthesized by other techniques (Hines et al., *J. Phys. Chem. B* 102:3655 (1998); Revaprasadu et al., *J. Mater. Chem.* 8:1885 (1998); Zhu et al., *Chem. Mater.* 12:73 (2000); Quinlan et al., *Langmuir* 16:4049 (2000), which are hereby incorporated by reference in their entirety), some of which involve tedious post-processing of the particles to narrow down the size distribution. The peaks obtained from the ZnSe particle populations grown with the process of the present invention are much narrower than any such peak obtained from "asgrown" II-VI nanoparticle populations known in the art. The low energy shoulder observed on all samples is attributed to emission from bulk ZnSe corresponding to particle aggregates, probably formed by coalescence of nanoparticles on the sample container walls. A comparison between the PL emission and transmission spectra is shown in FIG. 3B for sample 3. The limits of the absorption spectrum are indicated by the vertical arrows (a) (at 428 nm), and (c) (at 453 nm). Feature (b) (at 467 nm) is attributed to bulk ZnSe. The peak of the emission (d) (at 439 nm) lies approximately at the middle of the absorption wavelength interval (a-c). The nanocrystal-loaded microemulsions exhibit excellent stability. Photoluminescence spectra obtained from samples stored for one month after preparation exhibited no distinguishable variations when compared to the original ones.

Figure 4A:
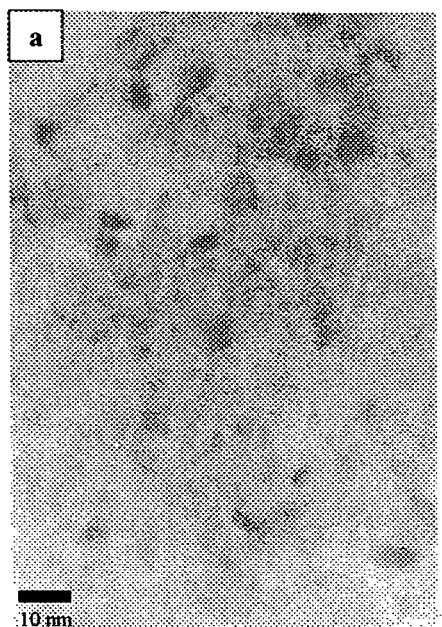
FIGS. 4A-4B are micrographs showing the TEM (FIG. 4A) and HR-TEM (FIG. 4B) images of ZnSe nanocrystals with an average diameter of 6 nm obtained by processing a 0.3 M diethylzinc solution in 40 nm heptane nanodroplets of a heptane/PEO-PPO-PEO/formamide microemulsion.
Figure 4B:
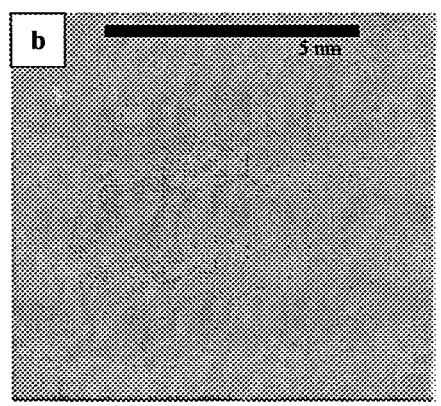

Additional characterization was performed of the ZnSe nanocrystals using transmission electron microscopy (TEM) and high-resolution TEM (HR-TEM). FIGS. 4A and 4B show TEM (FIG. 4A) and HR-TEM (FIG. 4B) images of ZnSe nanocrystals corresponding to a sample prepared using a 0.3 M initial diethylzinc concentration in heptane. The resulting particles are crystalline with average diameter of 6±0.7 nm (estimated from the TEM image). This indicates that the initial hypothesis for single nanocrystal formation per nanodroplet is reasonable. This technique can also offer flexibility in functionalization. For example, thiol-conjugated molecules can be dissolved in the heptane nanodroplets for in situ functionalization of the nanocrystals upon synthesis.

In conclusion, a novel microemulsion-gas contacting technique has been developed for controlled synthesis of compound semiconductor nanocrystals that utilizes the dispersed phase of a heptane/PEO-PPO-PEO/formamide microemulsion to form numerous identical nanoreactors, thus enabling precise control of particle size. The technique employs reactions between group-II alkyls and group-VI hydrides, similar to those used by the microelectronics industry for Metalorganic Vapor Phase Epitaxy of high quality thin films (Peck et al., *J. Crystal Growth* 170:523 (1997); Jones, A. C., *J. Crystal Growth* 129:728 (1993), which are hereby incorporated by reference in their entirety), and can be scaled up for industrial production. The growth of luminescent ZnSe quantum dots was demonstrated by reacting diethylzinc, dissolved in heptane nanodroplets, with hydrogen selenide gas bubbled through the microemulsion. Nanocrystal size and optical properties were tuned by changing the initial concentration of diethylzinc in the heptane nanodroplets. The microemulsion-encapsulated nanocrystals exhibit single, symmetric, and narrow photoluminescence, indicating good control on particle size and crystal structure without any post-processing step. They are also very stable with photoluminescence and absorption spectra that remain unchanged over a period of several months.

Example 2

Evaluation of Synthesis and Size-Control of Luminescent CdSe Nanocrystals by a Microemulsion-Gas Contacting Technique The microemulsion-gas contacting technique of the present invention has been extended to CdSe nanocrystal synthesis. X-ray diffraction patterns obtained from CdSe particles synthesized by bubbling hydrogen selenide diluted in hydrogen through a dimethylcadmium solution in heptane at room temperature confirm the formation of cubic CdSe. A microemulsion was formed by self assembly using a solution of dimethylcadmium (($CH_3$)$_2$Cd) in n-heptane (n-$C_7H_{16}$) as the dispersed oil phase, formamide ($CH_3NO$) as the polar continuous phase, and an amphiphilic block copolymer, poly (ethylene oxide)-poly(propylene oxide)-poly(ethylene oxide) or PEO-PPO-PEO, as the surfactant. PEO is the formamide-soluble block and PPO the heptane-soluble block (Alexandridis et al., *Macromolecules* 33:3382 (2000), which is hereby incorporated by reference in its entirety). PEO-PPO block copolymers represent an exciting class of amphiphilic molecules with high versatility, in terms of self-assembly and corresponding practical applications (Alexandridis et al., Eds. *Amphiphilic Block Copolymers: Self-Assembly and Applications*, Elsevier Science B. V.: Amsterdam (2000), which is hereby incorporated by reference in its entirety). Imhof et al. (Imhof et al., *J. Colloid Interface Sci.* 192:368 (1997), which is hereby incorporated by reference in its entirety) tested a variety of different combinations of amphiphiles with non-aqueous polar solvents, and reported that PEO-PPO-PEO block copolymers form very stable emulsions in formamide. Formamide was used instead of water, because it is sufficiently polar to be immiscible in heptane and it does not react with dimethycadmium. Hydrogen selenide ($H_2Se$) gas diluted in hydrogen was bubbled through the microemulsion at room temperature and atmospheric pressure, diffused into the nanodroplets, and reacted with dimethylcadmium to yield CdSe and ethane ($C_2H_6$). By assuming (and subsequently verifying) that a single CdSe particle is formed in each nanodroplet, the initial concentration of dimethylcadmium was used to specify the particle size.

Dimethylcadmium (($CH_3)_2Cd$, 1M solution in n-heptane) was purchased from Strem Chemicals, Inc., and formamide ($CH_3NO$, 99.5+%) and n-heptane (n-$C_7H_{16}$, 99%) were purchased from Aldrich. Electronic-grade hydrogen selenide gas ($H_2Se$, 5% mixture with $H_2$) was purchased from Solkatronic Chemicals. Pluronic P105, poly (ethylene oxide)-poly (propylene oxide)-poly (ethylene oxide) or PEO-PPO-PEO block copolymer ($EO_{37}PO_{58}EO_{37}$, with MW of 6,500 and 50% PEO content), was provided by BASF Corporation. All chemicals were used "as received." Care was taken to avoid exposure of the hygroscopic formamide and PEO-PPO-PEO to atmospheric moisture. Standard airless techniques were used to avoid exposure of dimethylcadmium to oxygen and moisture.

Figure 5:
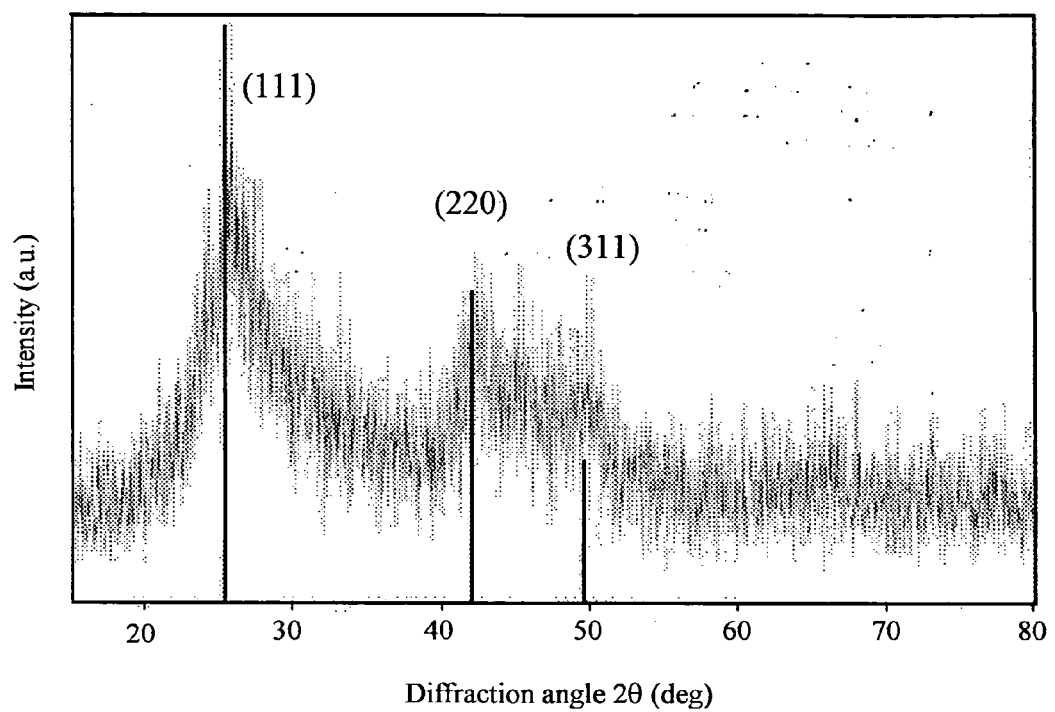
FIG. 5 is a graph showing the X-ray diffraction pattern from CdSe particle aggregates obtained by reacting dimethylcadmium (diluted in heptane) with hydrogen selenide gas (diluted in hydrogen) at room temperature. The vertical lines at 25.4°, 42°, and 49.7° correspond to the expected diffraction angles (2θ) of the (111), (220), and (311) planes of cubic CdSe.

To investigate the feasibility of the proposed chemistry for low-temperature synthesis of crystalline CdSe, the 5% hydrogen selenide/hydrogen gas mixture was first bubbled through a 0.1 M solution of dimethylcadmium in heptane at room temperature and atmospheric pressure. This "proof-of-principle" experiment did not involve a microemulsion. The result was a suspension of CdSe particle aggregates in heptane. Samples taken from the suspension were placed on clean quartz wafers and the heptane was evaporated under vacuum. The resulting deposits of CdSe particles on quartz were analyzed by x-ray diffraction. The diffraction peaks obtained (FIG. 5) match the standard peaks corresponding to cubic (zinc blende) CdSe, confirming that the reaction does yield crystalline CdSe at room temperature. No indication of a hexagonal (wurtzite) structure was found. Since the results were encouraging, subsequent experiments were conducted using microemulsions in order to precisely control the particle size.

The dimethylcadmium-containing microemulsions were formed as follows: (a) 3.33 gr PEO-PPO-PEO was added to 20 ml formamide and the mixture was stirred for 1.5 hrs.; (b) 0.5 ml of dimethylcadmium-heptane solution was added to PEO-PPO-PEO/formamide solution under nitrogen; and (c) the final mixture was sonicated for 1.5 hrs. The resulting liquid was transparent and homogeneous, an indication that a microemulsion was formed (Danielsson et al., *Colloids Surf.* 3:391 (1981), which is hereby incorporated by reference in its entirety). It was subsequently transferred to the reactor (located in a vented enclosure) under nitrogen. A flow of 20 sccm 5% hydrogen selenide in hydrogen was established and the gas was allowed to bubble through the microemulsion for 15 min. This time was found to be sufficient for converting all the dimethylcadmium to CdSe. The reactor was subsequently purged with nitrogen for 1 hr to remove all traces of hydrogen selenide. The gases exiting the reactor were passed through a cracking furnace and a bed of adsorbents before released into a fume hood. A hydride detector was used to ensure personnel safety.

Photoluminescence (PL) emission spectra can be obtained by loading samples from the reactor into quartz cuvettes and can be analyzed by using a 0.5 m single-stage spectrometer (CVI Laser Corp.), equipped with a thermoelectrically-cooled multi-channel CCD detector (Camera AD-205 working in the wavelength range of 200-1100 nm). A 325 nm line of a 20 mW He—Cd UV laser (Melles Giot) can be used to excite the nanocrystals. Transmission spectra from samples loaded in quartz cuvettes can be obtained by using a 150 W Xenon lamp (UV) and a 0.35 m scanning monochromator (McPherson) with PMT phase sensitive detection. The samples used for transmission electron microscopy can be prepared by placing a drop of the processed microemulsion on a 400-mesh carbon-coated copper grid (Ernest F. Fullam, Inc.) and leaving it under vacuum for 48 hours to evaporate the solvents. For transmission electron microscopy, a JEOL JEM 2010 high-resolution TEM instrument, operated at 200 kV, with a point-to-point resolution of 0.193 nm, can be used. Dynamic light scatterering can be performed to estimate the microemulsion droplet size, prior to each synthesis experiment, using a model 95 argon ion laser (Lexel Corp.) with a BI-200 SM goniometer detector (Brookhaven Instruments Corp.) operating at an angle of 90°. X-ray diffraction can be performed using a Siemens D500 XR diffractometer.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A process for synthesizing nanoparticles, said process comprising:
    providing a stable emulsion comprising a plurality of droplets suspended in a continuous phase, wherein said droplets comprise a first reactant dissolved in a dispersed phase, and wherein said droplets are encapsulated by a surfactant; and
    contacting a gas phase comprising a second reactant diluted in a carrier gas with the stable emulsion under conditions effective to permit the first reactant and second reactant to react and form nanoparticles within the droplets, wherein the surfactant is selected to eliminate droplet-droplet coalescence in said process.

2. The process according to claim 1, wherein said droplets have an average diameter of between about 10 and about 200 nanometers.

3. The process according to claim 1, wherein said surfactant is a poly(ethylene oxide)-poly(propylene oxide)-poly (ethylene oxide).

4. The process according to claim 1, wherein the dispersed phase comprises a first emulsion precursor and the continuous phase comprises a second emulsion precursor, said first emulsion precursor and said second emulsion precursor being sufficiently immiscible with one another so that they are effective in yielding said stable emulsion when mixed with said surfactant.

5. The process according to claim 4, wherein said first emulsion precursor is a polar solution and said second emulsion precursor is a nonpolar solution.

6. The process according to claim 4, wherein said first emulsion precursor is a nonpolar solution and said second emulsion precursor is a polar solution.

7. The process according to claim 4, wherein said first emulsion precursor and said second emulsion precursor are both polar solutions.

8. The process according to claim 4, wherein said first emulsion precursor and said second emulsion precursor are both nonpolar solutions.

9. The process according to claim 4, wherein said first emulsion precursor is a nonpolar solution, wherein the nonpolar solution is selected from the group consisting of n-hexane, n-heptane, and n-octane.

10. The process according to claim 4, wherein said second emulsion precursor is a polar solution, wherein the polar solution is selected from the group consisting of formamide and water.

11. The process according to claim 1, wherein said first reactant comprises a metal-containing compound.

12. The process according to claim 11, wherein said metal is selected from the group consisting of Zn, Cd, Hg, and Pb.

13. The process according to claim 1, wherein said first reactant comprises an organometallic compound.

14. The process according to claim 13, wherein said organometallic compound is selected from the group consisting of dimethyl-Zn, dimethyl-Cd, dimethyl-Hg, diethyl-Zn, diethyl-Cd, diethyl-Hg, tetramethyl-Pb, and tetraethyl-Pb.

15. The process according to claim 14, wherein said organometallic compound is diethyl-Zn.

16. The process according to claim 14, wherein said organometallic compound is dimethyl-Zn.

17. The process according to claim 14, wherein said organometallic compound is diethyl-Cd.

18. The process according to claim 14, wherein said organometallic compound is dimethyl-Cd.

19. The process according to claim 1, wherein said second reactant is in the form of a gas or vapor.

20. The process according to claim 1, wherein said second reactant comprises a Group VI element-containing compound.

21. The process according to claim 20, wherein said Group VI element is selected from the group consisting of Se, S, Te, and O.

22. The process according to claim 20, wherein said Group VI element-containing compound is in the form of a hydride.

23. The process according to claim 22, wherein said hydride is a hydride of Se, S, or Te.

24. The process according to claim 23, wherein said hydride of Se is $H_2Se$ gas.

25. The process according to claim 20, wherein said Group VI element is oxygen.

26. The process according to claim 25, wherein the oxygen-containing compound is in the form of molecular oxygen ($O_2$) gas, ozone ($O_3$) gas, or water ($H_2O$) vapor.

27. The process according to claim 20, wherein said Group VI element is Te.

28. The process according to claim 27, wherein the Te-containing compound is in the form of a vapor of dimethyl-Te, diethyl-Te, or diisopropyl-Te.

29. The process according to claim 1, wherein said carrier gas comprises a gas that does not react with said first reactant, said second reactant, said stable emulsion, or a product of said process.

30. The process according to claim 29, wherein said carrier gas is selected from the group consisting of hydrogen, nitrogen, helium, and argon.

31. The process according to claim 1, wherein said nanoparticles have a diameter of between about 1 and about 100 nanometers.

32. The process according to claim 1, wherein said nanoparticles are in crystalline form, polycrystalline form, or amorphous form.

33. The process according to claim 1, wherein said nanoparticles are nanocrystals.

34. The process according to claim 33, wherein said nanocrystals exhibit size-dependent luminescence or fluorescence.

35. The process according to claim 33, wherein said nanocrystals are PbSe or PbS nanocrystals.

36. The process according to claim 33, wherein said nanocrystals are luminescent Group II-Group VI nanocrystals of the form MX, wherein M is Zn, Cd, or Hg, and wherein X is Se, S, Te, or O.

37. The process according to claim 36, wherein said nanocrystals are ZnSe nanocrystals.

38. The process according to claim 37, wherein said ZnSe nanocrystals have a diameter of between about 1.0 and about 10 nanometers.

39. The process according to claim 36, wherein said nanocrystals are CdSe nanocrystals.

40. The process according to claim 39, wherein said CdSe nanocrystals have a diameter of between about 1.0 and about 10 nanometers.

41. The process according to claim 1, wherein said first reactant comprises diethyl-Zn, said dispersed phase comprises n-heptane, and said second reactant comprises $H_2Se$, wherein the diethyl-Zn is in said n-heptane in an initial concentration of between about 0.001 M and about 0.3 M, and the diethyl-Zn and the $H_2Se$ react to form ZnSe nanocrystals having a diameter of not greater than about 10 nanometers.

42. The process according to claim 1, wherein said continuous phase comprises formamide, said surfactant comprises a poly(ethylene oxide)-poly(propylene oxide)-poly(ethylene oxide), and said dispersed phase comprises n-heptane.

43. The process according to claim 1, wherein said first reactant comprises diethyl-Zn, said dispersed phase comprises n-heptane, said second reactant comprises hydrogen selenide, and said carrier gas comprises hydrogen.

44. The process according to claim 1, wherein said droplet further comprises a third reactant comprising a transition metal-containing compound, said transition metal being selected from the group consisting of Mn, Fe, and Co.

45. The process according to claim 44, wherein said transition metal-containing compound is a metal-carbonyl compound or a metal-alkyl compound.

46. The process according to claim 45, wherein said transition metal is provided in an amount effective to yield diluted magnetic semiconductor nanoparticles.

47. The process according to claim 46, wherein said diluted magnetic semiconductor nanoparticles comprise a formula of $Zn_{1-x}Mn_xSe$, wherein x is a value between about 0 and about 0.2.

48. The process according to claim 1, wherein said contacting comprises bubbling said gas phase through said stable emulsion under conditions effective to allow said second reactant to diffuse into said droplet and to react with said first reactant to form said nanoparticles.

49. The process according to claim 1, wherein said contacting is performed at a temperature at which said emulsion remains stable at atmospheric pressure or at a pressure higher than atmospheric pressure.

50. The process according to claim 1 further comprising incorporating a functional material onto the surface of said nanoparticles.

51. The process according to claim 50, wherein said functional material is dissolved in said dispersed phase prior to said contacting.

52. The process according to claim 50, wherein said functional material is added to the outer surface of said nanoparticle.

53. The process according to claim 50, wherein said functional material comprises either a thiol-based compound or an amine-based compound.

54. The process according to claim 1 further comprising isolating said nanoparticles.

55. The process according to claim 1, wherein said nanoparticles are of substantially the same size.

56. The process according to claim 55, wherein the size of said nanoparticles is dependent on the initial concentration of the first reactant prior to said contacting.

57. The process according to claim 1, wherein said process is carried out under conditions effective to form a single nanoparticle in a single droplet.

* * * * *